US009469031B2

(12) United States Patent
Saito (10) Patent No.: US 9,469,031 B2
(45) Date of Patent: Oct. 18, 2016

(54) MOTION LIMITING DEVICE AND MOTION LIMITING METHOD

(71) Applicant: TOYOTA JIDOSHA KABUSHIKI KAISHA, Toyota-shi, Aichi-ken (JP)

(72) Inventor: Fuminori Saito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/657,411

(22) Filed: Mar. 13, 2015

(65) Prior Publication Data
US 2015/0306767 A1  Oct. 29, 2015

(30) Foreign Application Priority Data

Apr. 24, 2014 (JP) ................................. 2014-089942

(51) Int. Cl.
*G05B 19/00* (2006.01)
*B25J 9/16* (2006.01)

(52) U.S. Cl.
CPC ............... *B25J 9/1666* (2013.01); *B25J 9/162* (2013.01); *B25J 9/1676* (2013.01); *B25J 9/1697* (2013.01); *G05B 2219/40298* (2013.01); *G05B 2219/40323* (2013.01); *Y10S 901/01* (2013.01)

(58) Field of Classification Search
CPC combination set(s) only.
See application file for complete search history.

(56) References Cited

U.S. PATENT DOCUMENTS 4,589,810 A * 5/1986 Heindl .................... B25J 13/02
414/4
5,237,468 A * 8/1993 Ellis ......................... B25J 5/02
360/92.1

(Continued)

FOREIGN PATENT DOCUMENTS

JP   H11-226889 A   8/1999
JP   2003-167628 A  6/2003

(Continued)

OTHER PUBLICATIONS

Chung, Woojin et al., "Safe Navigation of a Mobile Robot Considering Visibility of Environment." IEEE Transactions on Industrial Electronics, vol. 56, No. 10, pp. 3941-3950, Oct. 2009.

*Primary Examiner* — Jonathan L Sample
(74) *Attorney, Agent, or Firm* — Oliff PLC (57) ABSTRACT

A motion limiting device includes: detection means that detects environmental information around a robot; generation means that generates, based on the environmental information detected by the detection means, a three-dimensional environment model that includes an unobservable area and an observable area and indicates a working environment in which the robot operates, the unobservable area being the area where the environmental information cannot be detected by the detection means, and the observable area being the area where the environmental information can be detected by the detection means; and limiting means that limits a motion of the robot when it is determined that the robot has entered the unobservable area based on the three-dimensional environment model generated by the generation means.

6 Claims, 6 Drawing Sheets

(56) References Cited

U.S. PATENT DOCUMENTS

| | | | | |
|---|---|---|---|---|
| 5,280,622 | A * | 1/1994 | Tino | B25J 19/06 700/255 |
| 5,579,444 | A * | 11/1996 | Dalziel | B25J 9/1697 382/153 |
| 5,845,048 | A * | 12/1998 | Masumoto | B25J 9/1697 706/20 |
| 6,285,920 | B1 * | 9/2001 | McGee | G05B 19/423 219/125.11 |
| 6,314,341 | B1 * | 11/2001 | Kanayama | G05D 1/0221 180/167 |
| 6,347,261 | B1 * | 2/2002 | Sakaue | B25J 9/1694 345/156 |
| 6,435,794 | B1 * | 8/2002 | Springer | B25J 3/04 340/407.1 |
| 6,453,212 | B1 * | 9/2002 | Asama | B25J 5/007 318/587 |
| 7,015,831 | B2 * | 3/2006 | Karlsson | G01C 21/12 318/568.11 |
| 7,848,850 | B2 * | 12/2010 | Hoshino | B25J 15/0009 382/153 |
| 7,873,448 | B2 * | 1/2011 | Takeda | G06T 7/0042 700/253 |
| 8,369,606 | B2 * | 2/2013 | Liu | G06K 9/00476 382/106 |
| 8,570,320 | B2 * | 10/2013 | Izadi | G06T 17/00 345/156 |
| 2002/0013641 | A1 * | 1/2002 | Nourbakhsh | G05D 1/0214 700/245 |
| 2003/0114959 | A1 * | 6/2003 | Sakamoto | G06N 3/008 700/245 |
| 2003/0144763 | A1 * | 7/2003 | Mori | B62D 57/032 700/245 |
| 2004/0199292 | A1 * | 10/2004 | Sakagami | G05D 1/0251 700/259 |
| 2005/0041839 | A1 * | 2/2005 | Saitou | H04N 1/00127 382/103 |
| 2005/0256611 | A1 * | 11/2005 | Pretlove | B25J 9/1664 700/264 |
| 2006/0056678 | A1 * | 3/2006 | Tanaka | G06N 3/008 382/153 |
| 2006/0140450 | A1 * | 6/2006 | Hong | G06K 9/00335 382/107 |
| 2006/0241792 | A1 * | 10/2006 | Pretlove | G06Q 50/00 700/83 |
| 2007/0022078 | A1 * | 1/2007 | Gupta | G06N 5/00 706/59 |
| 2007/0061040 | A1 * | 3/2007 | Augenbraun | A47L 5/225 700/245 |
| 2007/0061043 | A1 * | 3/2007 | Ermakov | A47L 5/225 700/263 |
| 2007/0233318 | A1 * | 10/2007 | Lei | G05D 1/0038 700/245 |
| 2008/0086236 | A1 * | 4/2008 | Saito | G01S 5/0252 700/245 |
| 2008/0123809 | A1 * | 5/2008 | Tudor | G01V 5/0083 378/57 |
| 2008/0147261 | A1 * | 6/2008 | Ichinose | G01C 22/006 701/24 |
| 2009/0198375 | A1 * | 8/2009 | Kanayama | G05D 1/0221 700/245 |
| 2010/0004778 | A1 * | 1/2010 | Arimatsu | B25J 9/1697 700/214 |
| 2010/0222925 | A1 * | 9/2010 | Anezaki | G05D 1/0221 700/253 |
| 2011/0126660 | A1 * | 6/2011 | Lauzier | B25J 17/0208 74/490.05 |
| 2011/0251533 | A1 * | 10/2011 | Han | A61H 1/0274 601/33 |
| 2012/0019627 | A1 * | 1/2012 | Choi | A47L 9/009 348/50 |
| 2012/0035797 | A1 | 2/2012 | Oobayashi et al. | |
| 2012/0197439 | A1 * | 8/2012 | Wang | B25J 9/1689 700/259 |
| 2012/0259462 | A1 * | 10/2012 | Aoba | B25J 9/1697 700/245 |
| 2013/0024025 | A1 * | 1/2013 | Hsu | G05D 1/0274 700/259 |
| 2013/0218341 | A1 * | 8/2013 | Teng | G05D 1/0234 700/259 |
| 2013/0325244 | A1 * | 12/2013 | Wang | G05D 1/028 701/26 |
| 2014/0277739 | A1 * | 9/2014 | Kornbluh | B25J 9/0006 700/260 |
| 2014/0320629 | A1 * | 10/2014 | Chizeck | G06F 3/016 348/81 |

FOREIGN PATENT DOCUMENTS

| | | |
|---|---|---|
| JP | 2008-142841 A | 6/2008 |
| JP | 2009-294934 A | 12/2009 |
| JP | 2010-064215 A | 3/2010 |
| JP | 2010-134656 A | 6/2010 |
| JP | 2013-114610 A | 6/2013 |

* cited by examiner

MOTION LIMITING DEVICE AND MOTION LIMITING METHOD

INCORPORATION BY REFERENCE

This application is based upon and claims the benefit of priority from Japanese patent application No. 2014-089942, filed on Apr. 24, 2014, the disclosure of which is incorporated herein in its entirety by reference.

BACKGROUND OF THE INVENTION

1. Field of the Invention

The present invention relates to a motion limiting device and a motion limiting method that limit motions of a robot.

2. Description of Related Art

A robot is known that determines whether it has come in contact with an obstacle near the robot based on environmental information around the robot and positional information of the robot to avoid the obstacle (see, for example, Japanese Unexamined Patent Application Publication No. 2010-064215).

For example, there may be an unobservable area in which it is impossible for the robot to check for the presence or the absence of an obstacle since the unobservable area is behind the robot itself and it is thus difficult for the robot to avoid the unobservable area. In such a case, the robot enters the unobservable area. At this time, when an obstacle is present in the unobservable area, the robot may unexpectedly come in contact with the obstacle.

SUMMARY OF THE INVENTION

The present invention has been made in order to solve these problems and aims to provide a motion limiting device and a motion limiting method capable of mitigating, even when the robot comes in contact with an obstacle in the unobservable area, an impact caused by the contact.

One aspect of the present invention to achieve the aforementioned object is a motion limiting device including: detection means that detects environmental information around a robot; generation means that generates, based on the environmental information detected by the detection means, a three-dimensional environment model that includes an unobservable area and an observable area and indicates a working environment in which the robot operates, the unobservable area being the area where the environmental information cannot be detected by the detection means, and the observable area being the area where the environmental information can be detected by the detection means; and limiting means that limits a motion of the robot when it is determined that the robot has entered the unobservable area based on the three-dimensional environment model generated by the generation means.

In this aspect, the limiting means may limit at least one of a motion speed, a motion acceleration, and an operational force of the robot.

In this aspect, the robot may include operation means for operating an operation target object and moving means for moving the robot, and upon determining that the robot has entered the unobservable area based on the three-dimensional environment model generated by the generation means, the limiting means may decrease at least one of a motion speed limit value that determines an upper limit of the motion speed of the moving means and the operation means, a motion acceleration limit value that determines an upper limit of the motion acceleration of the moving means and the operation means, and an operational force limit value that determines an upper limit of the operational force of the moving means and the operation means.

In this aspect, upon determining that the robot is within a predetermined distance from the unobservable area and has moved in a direction of the unobservable area based on the environmental information detected by the detection means and the three-dimensional environment model generated by the generation means, the limiting means decreases at least one of the motion speed limit value, the motion acceleration limit value, and the operational force limit value as the distance between the robot and the unobservable area decreases.

In this aspect, upon determining that the robot is within a predetermined distance from the obstacle in the observable area and has moved in a direction of the obstacle based on the environmental information detected by the detection means and the three-dimensional environment model generated by the generation means, the limiting means may decrease at least one of the motion speed limit value, the motion acceleration limit value, and the operational force limit value.

In this aspect, upon determining that the robot is within a predetermined distance from the obstacle in the observable area and has moved in a direction of the obstacle based on the environmental information detected by the detection means and the three-dimensional environment model generated by the generation means, the limiting means may decrease at least one of the motion speed limit value, the motion acceleration limit value, and the operational force limit value as the distance between the robot and the obstacle decreases.

One aspect of the present invention to achieve the aforementioned object may be a motion limiting method including: detecting environmental information around a robot; generating, based on the environmental information that is detected, a three-dimensional environment model that includes an unobservable area and an observable area and indicates a working environment in which the robot operates, the unobservable area being the area where the environmental information cannot be detected, and the observable area being the area where the environmental information can be detected; and limiting a motion of the robot when it is determined that the robot has entered the unobservable area based on the three-dimensional environment model that is generated.

According to the present invention, it is possible to provide a motion limiting device and a motion limiting method capable of mitigating, even when the robot comes in contact with an obstacle in the unobservable area, an impact caused by the contact.

The above and other objects, features and advantages of the present invention will become more fully understood from the detailed description given herein below and the accompanying drawings which are given by way of illustration only, and thus are not to be considered as limiting the present invention.

DESCRIPTION OF THE EXEMPLARY EMBODIMENTS

Figure 1:
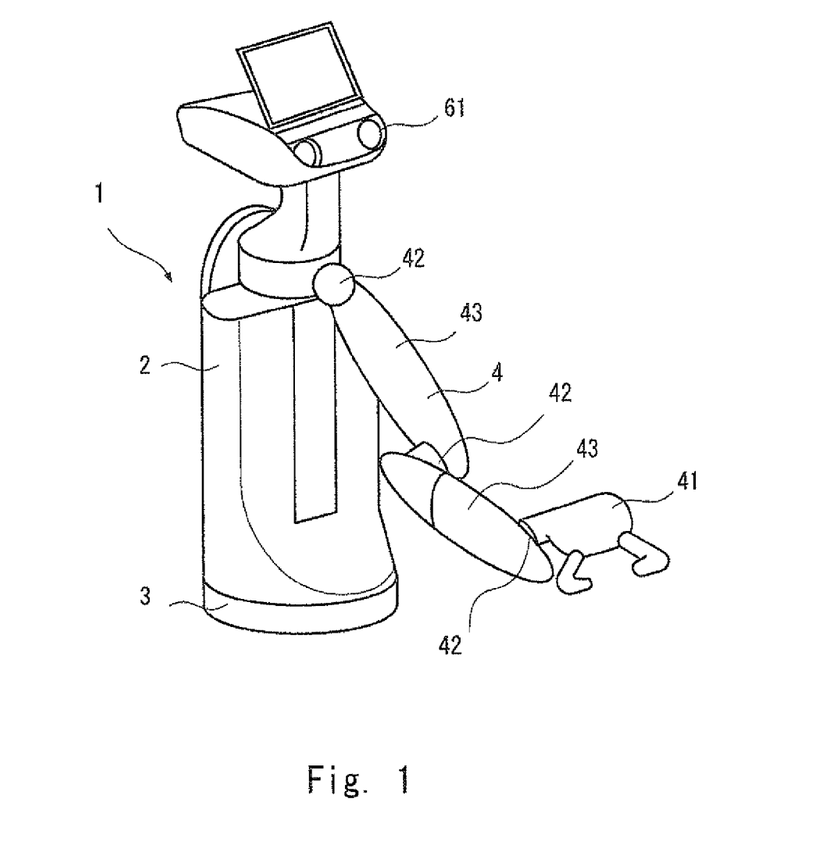
FIG. 1 is an oblique view showing a schematic configuration of a robot according to one embodiment of the present invention.

Hereinafter, with reference to the drawings, embodiments of the present invention will be described. FIG. 1 is an oblique view showing a schematic configuration of a robot according to one embodiment of the present invention. A robot 1 according to this embodiment is configured, for example, as a working robot that performs a remote operation in response to a user's instruction or autonomously performs an operation. A motion limiting device according to this embodiment limits motions of the robot 1.

Figure 2:
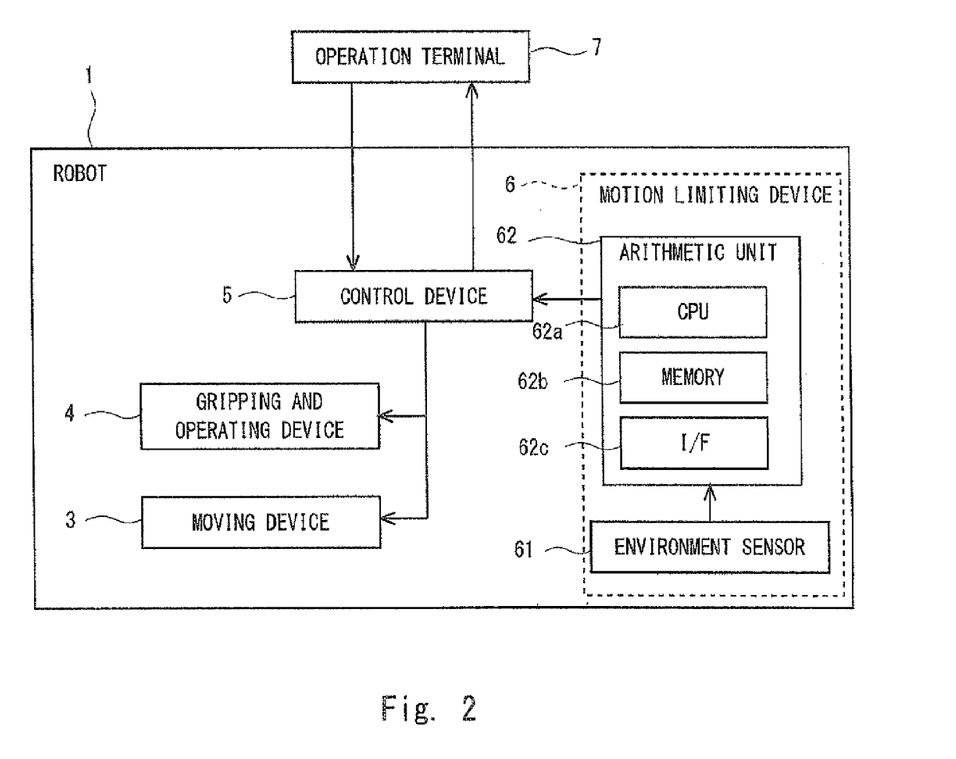
FIG. 2 is a block diagram showing a schematic system configuration of the robot according to the embodiment of the present invention.

FIG. 2 is a block diagram showing a schematic system configuration of the robot according to the embodiment of the present invention. The robot 1 according to this embodiment includes a robot body 2, a moving device 3 that moves the robot body 2, a gripping and operating device 4 that holds and moves an object, a control device 5 that controls the moving device 3 and the gripping and operating device 4, and a motion limiting device 6 that limits motions of the moving device 3 and the gripping and operating device 4.

The moving device 3 is one specific example of moving means. The moving device 3 moves, for example, a motor according to a control signal input from the control device 5 to rotate a plurality of wheels and move the robot body 2 to a desired position.

The gripping and operating device 4 is one specific example of operation means, and is configured, for example, as an articulated arm including a gripping part 41 that grips the object, a plurality of links 43 that are coupled through joints 42 such as a wrist joint, an elbow joint, a shoulder joint, and an actuator such as a motor that drives each of the joints 42.

The control device 5 causes the robot 1 to execute the work by controlling the moving device 3 and the gripping and operating device 4 based on the work information input through the operation terminal 7. The operation terminal 7 is, for example, a mobile terminal such as a tablet terminal, a personal computer (PC), and a smartphone. The operation terminal 7 includes, for example, a function to display an environmental image around the robot 1. The operation terminal 7 and the control device 5 are communicatively coupled by a wireless line or by a wired line, and exchange data.

The motion limiting device 6 includes an environment sensor 61 and an arithmetic unit 62.

The environment sensor 61 is one specific example of detection means and detects environmental information around the robot 1. While the environment sensor 61 is mounted, for example, on the head part of the robot 1 in this embodiment, the environment sensor 61 may be mounted on another part of the robot 1. The environment sensor 61 may be installed in a working environment in which the robot 1 operates. Further, a plurality of environment sensors 61 may be installed in the robot 1 and the working environment.

The environment sensor 61 is a distance sensor such as a camera (RGB-D camera, stereo camera), a laser range finder, or an ultrasonic sensor. The environment sensor 61 detects distance information indicating the distance of the robot 1 from an obstacle. The environment sensor 61 outputs the environmental information such as the detected distance information to the arithmetic unit 62.

The arithmetic unit 62 limits the motions of the robot 1 based on the environmental information detected by the environment sensor 61. While the arithmetic unit 62 is mounted on, for example, the robot 1 in this embodiment, the arithmetic unit 62 may be mounted on another device. The arithmetic unit 62 may be mounted on, for example, the operation terminal 7 instead of being mounted on the robot 1.

The arithmetic unit 62 is formed by hardware and mainly includes a microcomputer including, for example, a central processing unit (CPU) 62a that performs arithmetic processing and the like, a memory 62b including a read only memory (ROM) or a random access memory (RAM) storing arithmetic programs to be executed by the CPU 62a, and an interface unit (I/F) 62c that sends or receives signals to or from an external device. The CPU 62a, the memory 62b, and the interface unit 62c are interconnected through a data bus or the like.

Figure 3:
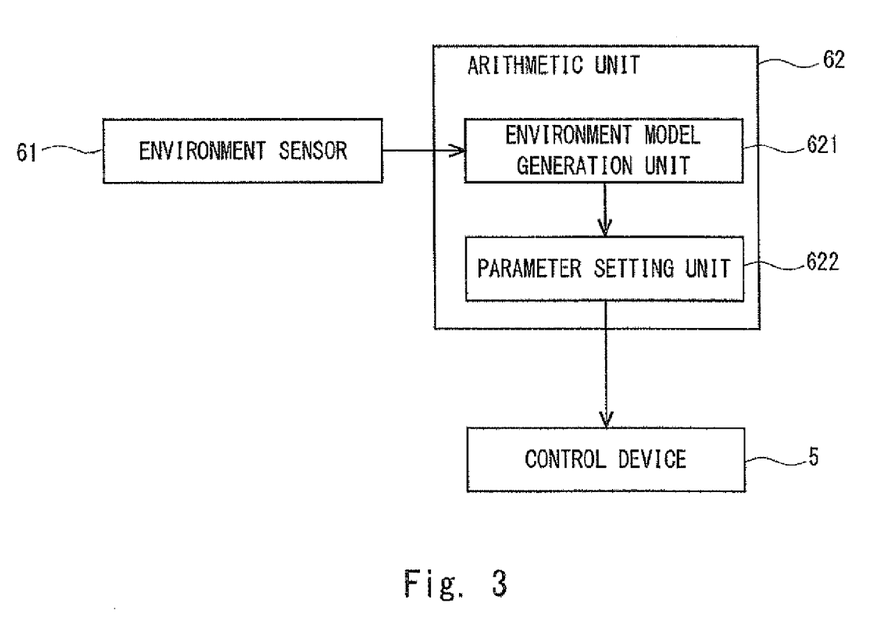
FIG. 3 is a block diagram showing a schematic system configuration of an arithmetic unit according to the embodiment of the present invention.

FIG. 3 is a block diagram showing a schematic system configuration of the arithmetic unit according to this embodiment. The arithmetic unit 62 according to this embodiment includes an environment model generation unit 621 and a parameter setting unit 622.

The environment model generation unit 621 is one specific example of generation means, and generates, based on the environmental information detected by the environment sensor 61, a three-dimensional environment model indicating a three-dimensional operational environment in which the robot 1 operates. The three-dimensional environment model includes an unobservable area in which the environment sensor 61 cannot detect the environmental information and an observable area in which the environment sensor 61 can detect the environmental information. The unobservable area is, for example, an area in which the environment sensor 61 could not previously measure the environmental information and thus the three-dimensional environment model cannot be generated since the environment sensor 61 has a narrow angle of view or the area is behind the environment sensor 61. The observable area is an area in which the three-dimensional environment model can be constructed by the environment sensor 61.

Figure 4:
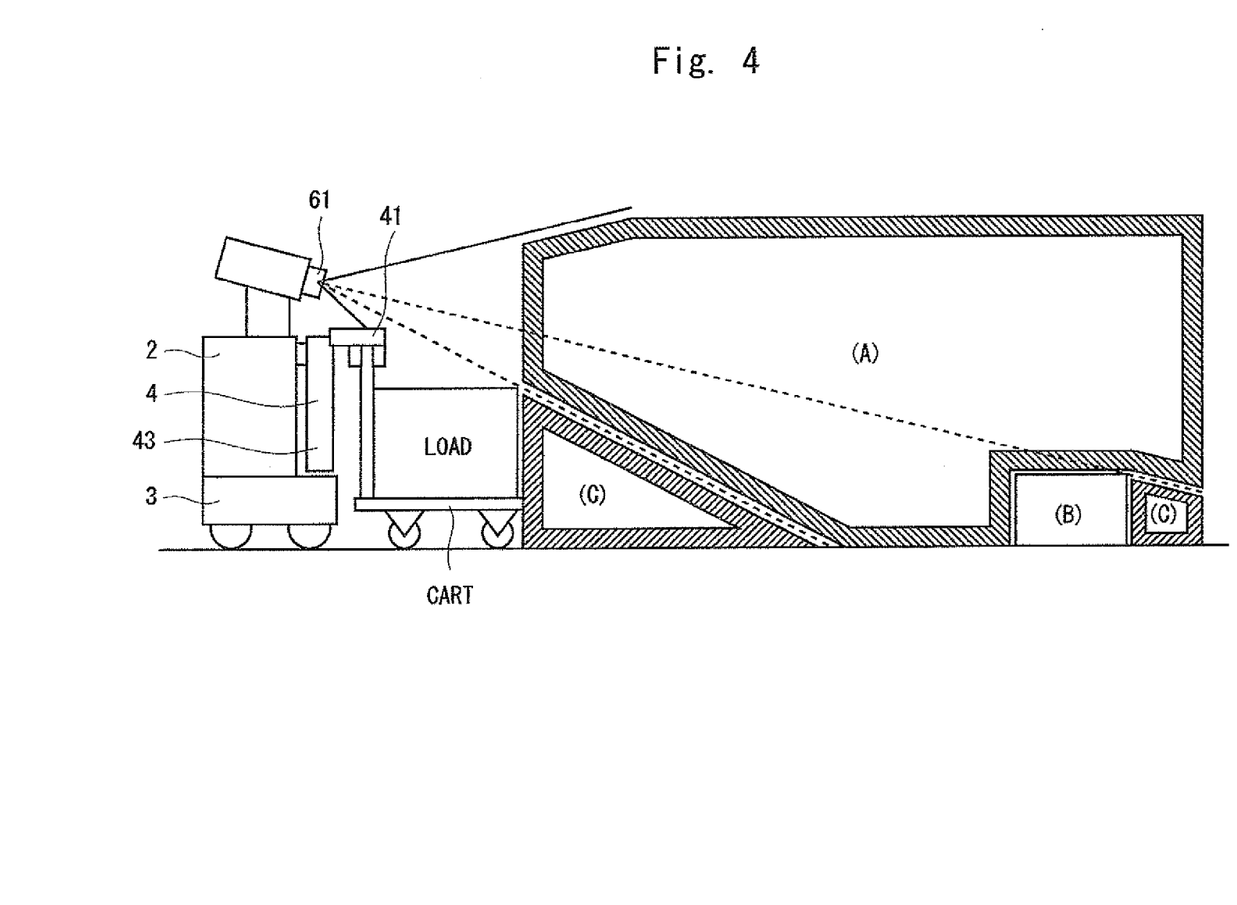
FIG. 4 is a diagram showing one example of an unobservable area when the robot starts an operation for pushing a cart.

FIG. 4 is a diagram showing one example of the unobservable area when the robot starts an operation for pushing a cart. As shown in FIG. 4, the unobservable area (C) is, for example, an area which is behind the robot itself or a load on the cart carried by the robot 1 and an area which is behind the obstacle when seen from the environment sensor 61.

The parameter setting unit 622 is one specific example of limiting means. The parameter setting unit 622 sets limiting parameters to limit the motions of the robot 1. The parameter setting unit 622 sets, for example, at least one of a motion speed limit value that limits a motion speed of the robot 1 and an operational force limit value that limits an operational force of the robot 1 to limit the motions of the robot 1.

The motion speed limit value is a limiting parameter that determines the upper limit of the motion speed of the moving device 3 and the gripping and operating device 4.

The operational force limit value is a limiting parameter that determines the upper limit of the operational force of the moving device 3 and the gripping and operating device 4. The parameter setting unit 622 outputs the motion speed limit value and the operational force limit value that are set to the control device 5.

The control device 5 controls each of the moving device 3 and the gripping and operating device 4 so that the motion speed of each of the moving device 3 and the gripping and operating device 4 becomes equal to or smaller than the motion speed limit value set by the parameter setting unit 622. For example, the control device 5 controls the moving device 3 so that the moving speed of the robot body 2 becomes equal to or smaller than the motion speed limit value set by the parameter setting unit 622. In a similar way, the control device 5 controls the gripping and operating device 4 so that the moving speed of each of the links 43 and the gripping part 41 becomes equal to or smaller than the motion speed limit value set by the parameter setting unit 622.

The control device 5 controls each of the moving device 3 and the gripping and operating device 4 so that the operational force of each of the moving device 3 and the gripping and operating device 4 becomes equal to or smaller than the operational force limit value set by the parameter setting unit 622. For example, the control device 5 controls the moving device 3 so that the drive torque of each wheel becomes equal to or smaller than the operational force limit value set by the parameter setting unit 622. In a similar way, the control device 5 controls the gripping and operating device 4 so that the drive torque of an actuator of each of the joints 42 and the gripping part 41 (or magnitude of a hand force vector) becomes equal to or smaller than the operational force limit value set by the parameter setting unit 622.

Incidentally, there may be a case, for example, in which it is difficult for the robot to avoid the unobservable area and the robot thus enters the unobservable area. In this case, when an obstacle is present in the unobservable area, the robot may unexpectedly come in contact with the obstacle. On the contrary, the robot may intentionally move in contact with the object in the unobservable area.

Meanwhile, the motion limiting device 6 according to this embodiment limits the motions of the robot 1 when it is determined that the robot 1 has entered the unobservable area.

For example, upon determining that the robot 1 has entered the unobservable area based on the three-dimensional environment model generated by the environment model generation unit 621, the parameter setting unit 622 decreases at least one of a motion speed limit value $V_{max}$ and an operational force limit value $F_{max}$ from a motion speed limit value VA and an operational force limit value FA for the observable area to a motion speed limit value VC and an operational force limit value FC for the unobservable area.

The situation in which the robot 1 enters the unobservable area also includes, for example, a case in which an operation target object operated by the robot 1 (the cart pushed by the robot 1 or the object gripped by the gripping and operating device 4) enters the unobservable area. Further, the motion speed limit value VA and the operational force limit value FA for the observable area are, for example, values that are suitable for allowing the robot 1 to perform a normal work (values by which the working efficiency can be kept high), and values with which an impact can be tolerated even when the robot 1 and the operation target object come in contact with a human. The motion speed limit value VA and the operational force limit value FA are set in the memory 62*b* or the like in advance. The motion speed limit value VC (VC<VA) and the operational force limit value FC (FC<FA) for the unobservable area are, for example, values by which an impact can be tolerated even when the robot 1 and the operation target object collide with an object which is assumed to be present in the unobservable area, and are stored in advance in the memory 62*b* or the like.

Accordingly, when the robot 1 enters the unobservable area, the motion speed of the robot 1 is limited to be low by the motion speed limit value and/or the operational force of the robot 1 is limited to be small by the operational force limit value. Accordingly, even when the robot 1 intentionally or unintentionally comes in contact with the obstacle in the unobservable area, the impact caused by the contact can be mitigated.

As shown in FIG. 4, for example, upon determining that the cart gripped and pushed by the gripping and operating device 4 has entered the unobservable area (C), the parameter setting unit 622 decreases the motion speed limit value and the operational force limit value $F_{max}$ to the motion speed limit value VC and the operational force limit value FC.

Accordingly, even when the user tries to powerfully operate the robot 1 through the operation terminal 7, for example, the moving speed of the robot 1 and the cart moving in the direction in which the robot 1 and the cart enter the unobservable area (C) is forced to be low by the motion speed limit value VC. Further, the operational force when the robot 1 pushes the cart in the direction in which the robot 1 enters the unobservable area (C) is forced to be low by the operational force limit value FC. Accordingly, even when the robot 1 and the cart enter the unobservable area (C) and intentionally or unintentionally come in contact with the obstacle in the unobservable area (C), the impact caused by the contact can be mitigated.

After that, upon determining that the robot 1 and the cart have gotten out of the unobservable area (C) and entered the observable area (A), the parameter setting unit 622 returns the motion speed limit value $V_{max}$ and the operational force limit value $F_{max}$ from the motion speed limit value VC and the operational force limit value FC for the unobservable area (C) to the normal motion speed limit value VA and the operational force limit value FA. Accordingly, the robot 1 is able to move the cart in a normal moving speed and to push the cart with a normal operational force, whereby it is possible to keep the high working efficiency.

The area where the robot 1 has operated before is regarded as the area that does not include any obstacle. Therefore, the environment model generation unit 621 changes the area in the unobservable area (C) where the robot 1 has operated before (the area where the robot 1 or the cart has passed through) in the three-dimensional environment model to the observable area (A) as necessary. In this way, by changing the unobservable area (C) to the observable area (A) according to the movement of the robot 1 to extend the observable area (A), the area where the robot 1 can operate at the normal moving speed and the normal operational force increases, whereby it is possible to keep the high working efficiency.

Further, when the robot 1 and the cart enter the observable area (A), the area which is behind the robot and the cart seen from the environment sensor 61 is newly generated in the observable area (A). Another obstacle rarely occurs, however, in a relatively short period of time during which the robot 1 performs work. Accordingly, on the premise that the number of obstacles does not increase during the work by the robot 1, even when an area is generated that cannot be observed from the environment sensor 61 in the observable area (A) where the presence or the absence of an obstacle has already been checked in the three-dimensional environment model, the environment model generation unit 621 keeps the state of this area as the state of the observable area (A). As described above, even when the robot 1 comes in contact with the obstacle in the unobservable area (C), it is possible to further keep the high working efficiency while mitigating the impact caused by the contact.

Upon determining that the cart gripped and pushed by the gripping and operating device 4 is within a predetermined distance (in the obstacle area (B)) from the obstacle in the observable area (A) and moves in the direction of the obstacle, the parameter setting unit 622 decreases at least one of the motion speed limit value $V_{max}$ and the operational force limit value $F_{max}$ from the motion speed limit value VA and the operational force limit value FA for the observed area (A) to the motion speed limit value VB (VB<VA) and the operational force limit value FB (FB<FA) for the obstacle area (B).

For example, upon determining that the cart gripped and pushed by the gripping and operating device 4 is within a predetermined distance (in the obstacle area (B)) from the obstacle and operates in the direction of the obstacle based on the three-dimensional environment model generated by the environment model generation unit 621 and the environmental information detected by the environment sensor 61, the parameter setting unit 622 decreases the motion speed limit value $V_{max}$ and the operational force limit value $F_{max}$ to the motion speed limit value VB and the operational force limit value FB. The motion speed limit value VB and the operational force limit value FB for the obstacle area (B) are values, for example, by which an impact can be tolerated even when the robot 1 and the operation target object contact the obstacle, and are set in advance in the memory 62b or the like. Accordingly, even when the robot 1 and the cart comes in contact with the obstacle, the impact caused by the contact can be mitigated.

Upon determining that the cart gripped and pushed by the gripping and operating device 4 is within a predetermined distance from the obstacle and moves in the direction of the obstacle based on the three-dimensional environment model generated by the environment model generation unit 621 and the environmental information detected by the environment sensor 61, the parameter setting unit 622 may gradually decrease the motion speed limit value and the operational force limit value as the distance between the cart and the obstacle decreases. Accordingly, the motion speed and the operational force can be further suppressed before the robot 1 and the cart contact the obstacle, whereby it is possible to further mitigate the impact caused by the contact with the obstacle.

Figure 5:
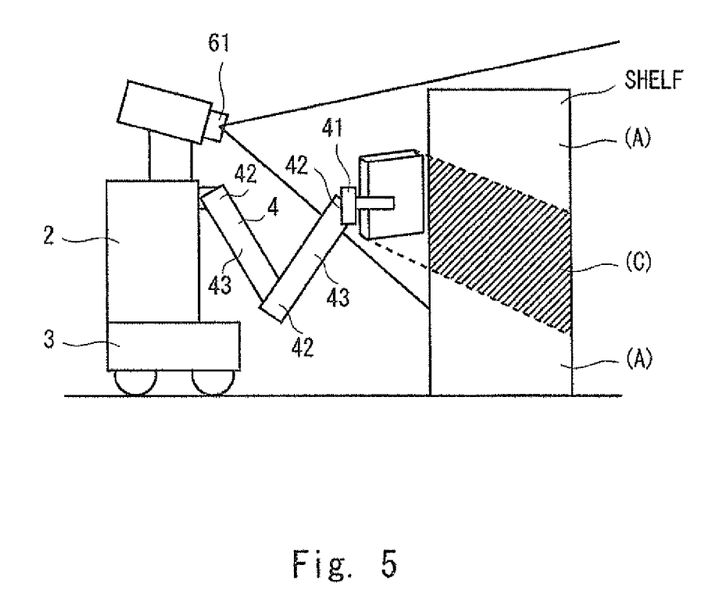
FIG. 5 is a diagram showing one example of a state in which the robot puts a gripped object gripped by a gripping and operating device on a shelf.

FIG. 5 is a diagram showing one example of a state in which the robot puts the object gripped by the gripping and operating device on a shelf. While the unobservable area (C) is an area where the environment sensor 61 cannot detect the environmental information (in reality, including a part that cannot be seen because of the presence of a shelf board or the area behind the shelf), the unobservable area (shaded area) in FIG. 5 is simplified for the sake of description.

When the robot 1 starts the work from the state shown in FIG. 5, the environmental model generation unit 621 of the arithmetic unit 62 generates the three-dimensional environment model including the unobservable area (C) which is the area behind the gripped object and the gripping and operating device 4 when seen from the environment sensor 61. When it has determined that the gripping and operating device 4 has entered the unobservable area (C) based on the three-dimensional environment model generated by the environment model generation unit 621, the parameter setting unit 622 decreases the motion speed limit value $V_{max}$ and the operational force limit value $f_{max}$ to the motion speed limit value VC and the operational force limit value FC.

Accordingly, even when the user tries to operate the robot 1 to a large extent through the operation terminal 7, for example, the moving speed of the robot 1 in the direction in which the gripped object and the gripping and operating device 4 enter the unobservable area (C) is forced to be low, and the operational force to move the gripped object in the direction in which the gripped object enters the unobservable area (C) is also forced to be low. Accordingly, even when the gripping and operating device 4 and the gripped object enter the unobservable area (C) and intentionally or unintentionally comes into contact with the obstacle in the unobservable area (C), the impact caused by the contact can be mitigated.

In order to confirm that there is no obstacle in the depth direction of the shelf, the robot 1 moves, for example, the gripped object and the gripping and operating device 4 up and down and left and right or in the front direction. Further, there are observable areas (A) up and down and left and right or in the front direction. Accordingly, when the robot 1 performs the operation for checking the obstacle, the parameter setting unit 622 determines that the gripped object and the gripping and operating device 4 have entered the observable area (A) and sets the motion speed limit value $V_{max}$ and the operational force limit value $F_{max}$ to the normal motion speed limit value VA and the operational force limit value FA. Accordingly, the robot 1 is able to execute the operation for checking the obstacle in the normal motion speed and the normal operational force in a short period of time.

Figure 6:
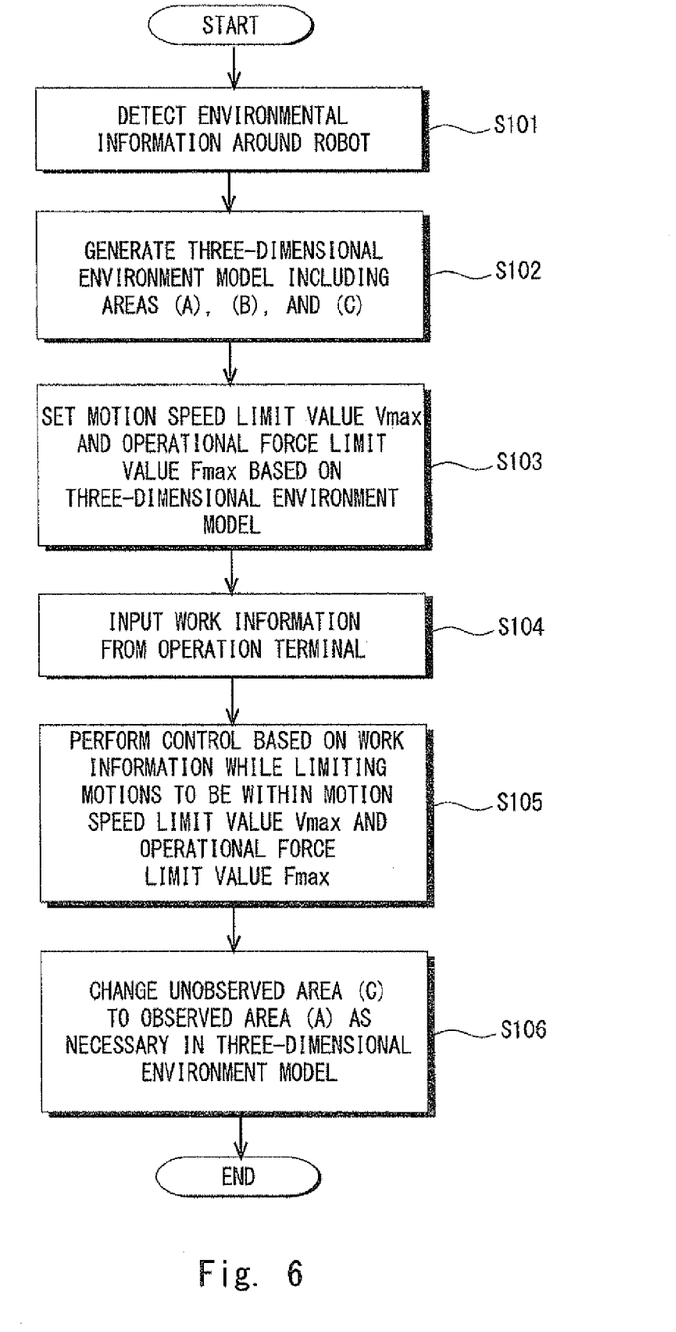
FIG. 6 is a flowchart showing a process flow of a motion limiting method according to the embodiment of the present invention.

FIG. 6 is a flowchart showing a process flow of a motion limiting method according to this embodiment. The processing shown in FIG. 6 is executed repeatedly, for example, for each period for sampling the data measured by the environment sensor 61 or each cycle for controlling the robot 1.

Before starting processing for each period, the environment model generation unit 621 of the arithmetic unit 62 initializes the three-dimensional environment model including the observable area (A), the obstacle area (B), and the unobservable area (C) in advance.

The environment sensor 61 detects environmental information around the robot 1 (Step S101) and outputs the environmental information that is detected to the environment model generation unit 621 of the arithmetic unit 62.

The environment model generation unit 621 generates, based on the environmental information output from the environment sensor 61, the three-dimensional environment model, in which the observable area (A) is the area which does not include any obstacle, the obstacle area (B) is the area within a predetermined distance from the obstacle that is detected, and the unobservable area (C) is the remaining area in which the presence or the absence of an obstacle can not be checked (Step S102). The environment model generation unit 621 outputs the three-dimensional environment model that is generated to the parameter setting unit 622.

Upon determining that the robot 1 is in the observable area (A) based on the three-dimensional environment model output from the environment model generation unit 621, the parameter setting unit 622 respectively sets the motion speed limit value $V_{max}$ and the operational force limit value $F_{max}$ to the motion speed limit value VA and the operational force limit value FA for the observable area (A) set in the memory 62b ($V_{max}$=VA, $F_{max}$=FA). Further, upon determining that the robot 1 has entered the unobservable area (C) based on the three-dimensional environment model output from the environment model generation unit 621, the parameter setting unit 622 sets the motion speed limit value $V_{max}$ and the operational force limit value $F_{max}$ to the motion speed limit value VC and the operational force limit value FC for the unobservable area (C) set in the memory 62b ($V_{max}$=VC, $F_{max}$=FC). Further, upon determining that the robot 1 is within the obstacle area (B) and moves in the direction of the obstacle based on the three-dimensional environment model output from the environment model generation unit 621 and the environmental information output from the environment sensor 61, the parameter setting unit 622 sets the motion speed limit value $V_{max}$ and the operational force limit value $F_{max}$ to the motion speed limit value VB and the operational force limit value FB for the obstacle area (B) set in the memory 62b ($V_{max}$=VB, $F_{max}$=FB) (Step S103). The parameter setting unit 622 outputs the motion speed limit value $V_{max}$ and the operational force limit value $F_{max}$ that are set to the control device 5.

The operation terminal 7 transmits the work information input by the user to the control device 5 (Step S104).

The control device 5 controls the moving device 3 and the gripping and operating device 4 based on the work information from the operation terminal 7 while limiting the motions of the moving device 3 and the gripping and operating device 4 to be within the motion speed limit value $V_{max}$ and the operational force limit value $F_{max}$ output from the parameter setting unit 622 of the arithmetic unit 62 (Step S105).

The environment model generation unit 621 changes the unobservable area (C) in which the robot 1 has operated to the observable area (A) as necessary in the three-dimensional environment model (Step S106).

As described above, the motion limiting device 6 according to this embodiment limits the motions of the robot 1 when it is determined that the robot 1 has entered the unobservable area. Accordingly, even when the robot 1 comes in contact with the obstacle in the unobservable area, it is possible to mitigate an impact caused by the contact.

The present invention is not limited to the above embodiment and may be changed as appropriate without departing from the spirit of the present invention.

While the parameter setting unit 622 limits the motions of the robot 1 by changing the motion speed limit value that limits the motion speed of the robot 1 and the operational force limit value that limits the operational force of the robot 1 in the above embodiment, the present invention is not limited to this case. The parameter setting unit 622 may limit the motions of the robot 1 by changing, for example, the motion acceleration limit value that limits the motion acceleration of the robot 1. In this case, the control device 5 controls each of the moving device 3 and the gripping and operating device 4 so that the motion acceleration of each of the moving device 3 and the gripping and operating device 4 becomes equal to or smaller than the motion acceleration limit value set by the parameter setting unit 622. The control device 5 controls, for example, the moving device 3 so that the moving acceleration of the robot body 2 becomes equal to or smaller than the motion acceleration limit value set by the parameter setting unit 622. In a similar way, the control device 5 controls the gripping and operating device 4 so that the moving acceleration of each of the links 43 and the gripping part 41 becomes equal to or smaller than the motion acceleration limit value set by the parameter setting unit 622.

Accordingly, when the robot 1 enters the unobservable area (C), the motion acceleration of the robot 1 is limited to be low by the motion acceleration limit value. Accordingly, even when the robot 1 intentionally or unintentionally comes in contact with the obstacle in the unobservable area, it is possible to mitigate the impact caused by the contact.

In the above embodiment, upon determining that the robot 1 is within a predetermined distance from the unobservable area (C) and operates in the direction of the unobservable area (C), the parameter setting unit 622 may decrease at least one of the motion speed limit value and the operational force limit value from the motion speed limit value VA and the operational force limit value FA for the observable area (A). Further, upon determining that the robot 1 is within a predetermined distance from the unobservable area (C) and operates in the direction of the unobservable area (C), the parameter setting unit 622 may gradually decrease the motion speed limit value and the operational force limit value as the distance between the robot 1 and the unobservable area (C) decreases.

It is therefore possible to further suppress the motion speed and the operational force before the robot 1 enters the unobservable area (C), whereby even when the robot 1 comes in contact with the obstacle in the unobservable area (C), it is possible to further mitigate the impact caused by the contact.

Further, the present invention can achieve the processing shown in FIG. 6 by causing, for example, the CPU 62a to execute a computer program.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.).

Further, the program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A motion limiting device comprising:
   detection means that detects environmental information around a robot;
   generation means that generates, based on the environmental information detected by the detection means, a three-dimensional environment model that includes an unobservable area and an observable area and indicates a working environment in which the robot operates, the unobservable area being the area where the environmental information cannot be detected by the detection means, and the observable area being the area where the environmental information can be detected by the detection means; and
   limiting means that limits a motion of the robot when it is determined that the robot has entered the unobservable area based on the three-dimensional environment model generated by the generation means, wherein the limiting means limits at least one of a motion speed, a motion acceleration, and an operational force of the robot, the robot comprises operation means for operating an operation target object and moving means for moving the robot, and upon determining that the robot has entered the unobservable area based on the three-dimensional environment model generated by the generation means, the limiting means decreases at least one of (i) a motion speed limit value that determines an upper limit of the motion speed of the moving means and the operation means, (ii) a motion acceleration limit value that determines an upper limit of the motion acceleration of the moving means and the operation means, and (iii) an operational force limit value that determines an upper of the operational force of the moving means and the operation means.

2. The motion limiting device according to claim 1, wherein, upon determining that the robot is within a predetermined distance from the unobservable area and moves in a direction of the unobservable area based on the environmental information detected by the detection means and the three-dimensional environment model generated by the generation means, the limiting means decreases at least one of the motion speed limit value, the motion acceleration limit value, and the operational force limit value as the distance between the robot and the unobservable area decreases.

3. The motion limiting device according to claim 1, wherein, upon determining that the robot is within a predetermined distance from the obstacle in the observable area and moves in a direction of the obstacle based on the environmental information detected by the detection means and the three-dimensional environment model generated by the generation means, the limiting means decreases at least one of the motion speed limit value, the motion acceleration limit value, and the operational force limit value.

4. The motion limiting device according to claim 3, wherein, upon determining that the robot is within a predetermined distance from the obstacle in the observable area and moves in a direction of the obstacle based on the environmental information detected by the detection means and the three-dimensional environment model generated by the generation means, the limiting means decreases at least one of the motion speed limit value, the motion acceleration limit value, and the operational force limit value as the distance between the robot and the obstacle decreases.

5. A motion limiting method comprising:
detecting environmental information around a robot;
generating, based on the environmental information that is detected, a three-dimensional environment model that includes an unobservable area and an observable area and indicates a working environment in which the robot operates, the unobservable area being the area where the environmental information cannot be detected, and the observable area being the area where the environmental information can be detected; and limiting a motion of the robot when it is determined that the robot has entered the unobservable area based on the three-dimensional environment model that is generated, wherein the limiting step limits at least one of a motion speed, a motion acceleration, and an operational force of the robot, the motion limiting method further comprises:
operating an operation target object, and
moving the robot, and upon determining that the robot has entered the unobservable area based on the three-dimensional environment model generated by the generation step, the limiting step decreases at least one of (i) a motion speed limit value that determines an upper limit of the motion speed of moving the robot and operating the operation target object, (ii) a motion acceleration limit value that determines an upper limit of the motion acceleration of moving the robot and operating the operation target object, and (iii) an operational force limit value that determines an upper limit of the operational force of moving the robot and operating the operation target object.

6. A motion limiting device comprising:
an environment sensor that detects environmental information around a robot;
an environment model generation unit that generates, based on the environmental information detected by the environment sensor, a three-dimensional environment model that includes an unobservable area and an observable area and indicates a working environment in which the robot operates, the unobservable area being the area where the environmental information cannot be detected by the environment sensor, and the observable area being the area where the environmental information can be detected by the environment sensor; and a parameter setting unit that limits a motion of the robot when it is determined that the robot has entered the unobservable area based on the three-dimensional environment model generated by the environment model generation unit, wherein the parameter setting unit limits at least one of a motion speed, a motion acceleration, and an operational force of the robot, the robot comprises a gripping and operating device that operates an operation target object and a moving device that moves the robot, and upon determining that the robot has entered the unobservable area based on the three-dimensional environment model generated by the environment model generation unit, the parameter setting unit decreases at least one of (i) a motion speed limit value that determines an upper limit of the motion speed of the moving device and the gripping and operating device, (ii) a motion acceleration limit value that determines an upper limit of the motion acceleration of the moving device and the gripping and operating device, and (iii) an operational force limit value that determines an upper limit of the operational force of the moving device and the gripping and operating device.

* * * * *